United States Patent [19]
Boyd et al.

[11] Patent Number: 5,587,084
[45] Date of Patent: Dec. 24, 1996

[54] METHOD OF REMOVING ORGANIC CONTAMINANTS FROM AIR AND WATER WITH ORGANOPHILIC, QUATERNARY PHOSPHONIUM ION-EXCHANGED SMECTITE CLAYS

[75] Inventors: Stephen A. Boyd; Ravi Kukkadapu, both of East Lansing, Mich.

[73] Assignee: Board of Trustees operating Michigan State University, East Lansing, Mich.

[21] Appl. No.: 384,967

[22] Filed: Feb. 7, 1995

[51] Int. Cl.[6] .................................. C02F 1/28; C02F 1/42
[52] U.S. Cl. ...................... 210/691; 210/908; 210/909; 95/141; 95/142; 95/143; 95/144; 95/146; 95/147
[58] Field of Search ..................... 210/690, 691, 210/692, 680, 679, 908, 909; 95/141, 142, 143, 144, 146, 147, 145

[56] References Cited

U.S. PATENT DOCUMENTS

| | | | |
|---|---|---|---|
| 2,367,384 | 1/1945 | Tymstra et al. | 210/680 |
| 4,386,010 | 5/1983 | Hildebrandt | 252/428 |
| 4,444,665 | 4/1984 | Hildebrant | 210/660 |
| 4,470,912 | 9/1984 | Beall | 210/691 |
| 4,473,477 | 9/1984 | Beall | 210/691 |
| 4,517,094 | 5/1985 | Beall | 210/664 |
| 4,549,966 | 10/1985 | Beall | 210/661 |
| 4,861,491 | 8/1989 | Svensson | 210/691 |
| 5,130,028 | 7/1992 | Cody et al. | 210/691 |
| 5,151,155 | 9/1992 | Cody et al. | 162/5 |
| 5,176,831 | 1/1993 | Rowsell | 210/631 |
| 5,268,109 | 12/1993 | Boyd | 210/691 |
| 5,401,418 | 3/1995 | Boyd | 210/691 |

*Primary Examiner*—Cynthia L. Nessler
*Attorney, Agent, or Firm*—Ian C. McLeod

[57] ABSTRACT

An quaternary phosphonium ion-exchanged clay and method of removing organic contaminants from air and/or water, by contacting the contaminants in the air or water with a quaternary phosphonium organo-clay. The clay is prepared by ion-exchange of an ion-exchangeable clay with (a) tetra-short chain alkyl ($C_1$–$C_4$) quaternary phosphonium ion or (b) a di- or tri-short chain alkyl ($C_1$–$C_4$) quaternary phosphonium ion having 1 or 2 mono-substituted or unsubstituted cycloakyl moieties, or one or two alkaryl moieties for removing air-laden and water-laden organic contaminants. The new organo-clays and methods are particularly adapted for removal of aromatic petroleum-based contaminants from water, such as benzene; alkyl-benzenes, such as toluene; xylenes (o-, m- and p-isomers); and chlorinated 1 and 2 carbon compounds, such as $CCl_4$.

9 Claims, 8 Drawing Sheets

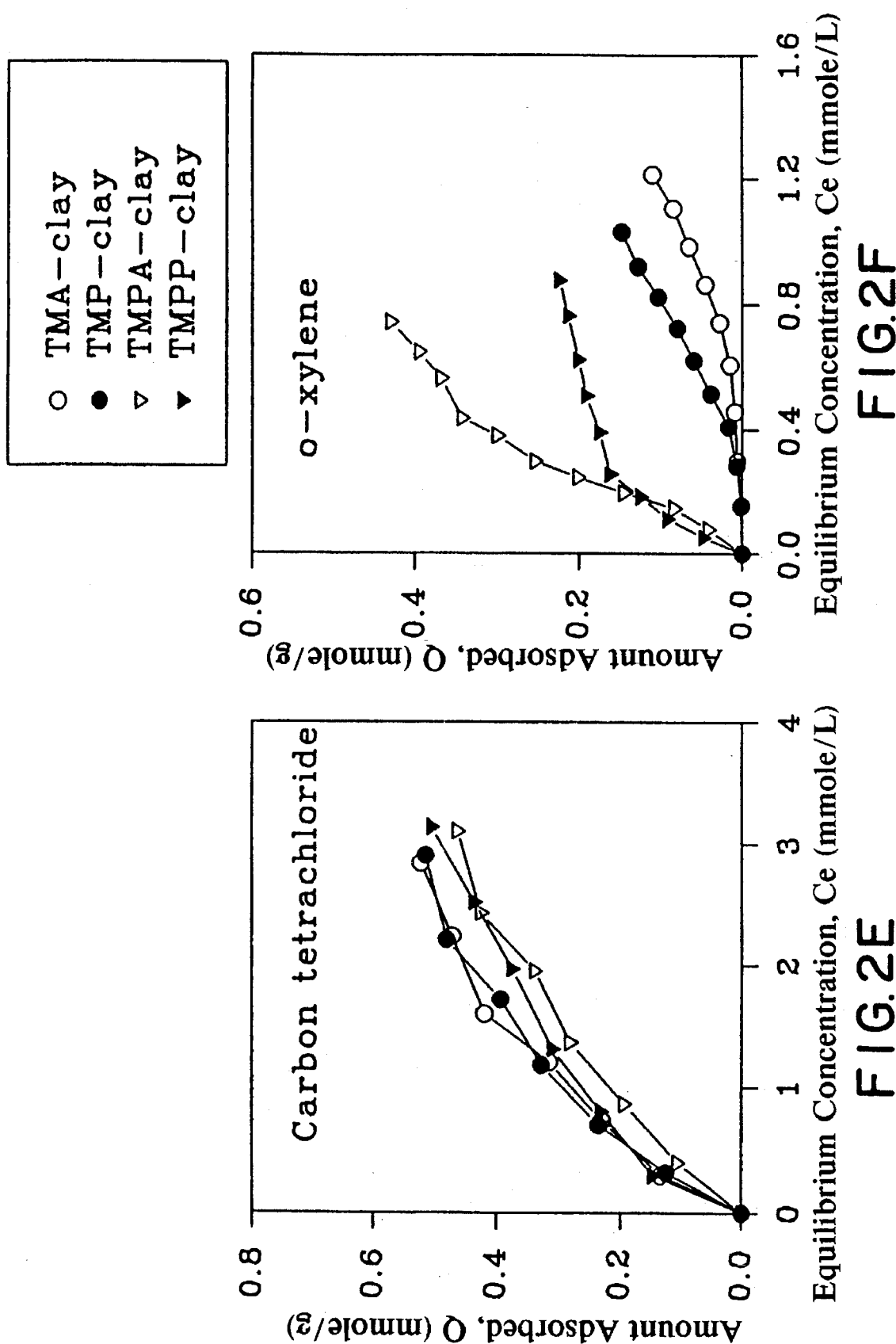

METHOD OF REMOVING ORGANIC CONTAMINANTS FROM AIR AND WATER WITH ORGANOPHILIC, QUATERNARY PHOSPHONIUM ION-EXCHANGED SMECTITE CLAYS

FIELD OF THE INVENTION

The present invention is directed to chemically modified organo-phosphonium clays, such as organo-phosphonium-smectite clays, to render the clay organophilic, and to a method of using the chemically modified clay to adsorb organic contaminants, such as chlorinated contaminants, e.g., carbon tetrachloride ($CCl_4$) and aromatic hydrocarbon contaminants, such as benzene and/or alkylbenzenes, from gases, particularly air, and from aqueous solutions.

More particularly, the present invention is directed to a cation-exchangeable clay that has been chemically modified to attach a quaternary phosphonium cation (QPC) comprised of four organic carbon moieties bonded to the central phosphorus atom, including short chain alkyl moieties ($C_1$–$C_4$); long chain alkyl moieties ($C_4$–$C_{20}$); substituted alkyl, e.g., halogenated, short or long chain alkyl moieties; substituted or unsubstituted cycloalkyl; substituted or unsubstituted aryl or alkaryl moieties, e.g., benzyl or phenyl; alkenes, e.g., propene; alkynes; aldehydes, e.g., acetaldehyde; ketones, e.g., acetophenone; alcohols, e.g., isobutylalcohol; carboxylic acids, e.g., valeric acid; esters, e.g., methylacetate; ethers; cyclic ethers; and combinations thereof, to provide an organo-phosphonium ion-modified clay, such as a smectite clay, capable of removing organic contaminants, such as aliphatic or aromatic hydrocarbons or chlorocarbons, from air and water.

BACKGROUND OF THE INVENTION AND PRIOR ART

Bentonite (smectite) clays are used widely in the construction of liners for hazardous waste landfills, slurry walls, industrial waste treatment lagoons, sewage lagoons, and tank forms. The utility of clays as waterproofing barriers or liners is derived from their ability to disaggregate upon hydration and form a dispersed phase of very small particles. These small clay particles effectively fill the void spaces between larger soil particles resulting in greatly reduced hydraulic conductivity. Thus, the primary function of clay liners, as well as synthetic geomembranes, is to impede the movement of water.

Smectite clays contain a net negative charge due to isomorphous substitution in the aluminosilicate layers. In nature, this charge is neutralized by inorganic cations such as $Na^+$ or $Ca^{2+}$ on the clay interlayers and external surfaces. Hydration of these cations in the presence of water initiates a separation of the clay layers causing a swelling of the clay. In smectites exchanged with monovalent cations having high hydration energies, e.g., $Na^+$ or $Li^+$, the individual clay layers may become completely separated in the presence of water. However, the maximum distance between individual clay layers of divalent cation-exchanged smectites, e.g., $Ca^{2+}$ or $Mg^{2+}$, is about 19 Å. Thus, in the construction of clay liners, Na-smectites are more effective in reducing hydraulic conductivity because they form small highly-dispersed particles in water.

The hydration of naturally occurring inorganic metal exchange ions on clays also imparts a hydrophilic nature to the clay layers. As a result, natural clays are ineffective in removing organic contaminants from water. However, by simple ion-exchange reactions, the naturally occurring inorganic exchange ions of clays can be replaced by a variety of organic cations and this may change the clay surface from hydrophilic to organophilic. These ion-exchange reactions can be used to form stable organo-clay complexes with high affinities for organic contaminants. Such organo-clays can be used in conjunction with conventional clays to increase the contaminant capabilities of clay barriers by immobilizing organic contaminants present in leachate. The sorptive properties of soils for organic contaminants also can be greatly enhanced by organic cation exchange of soil clays. Other possible environmental applications of organo-clays are in the stabilization, solidification of industrial wastes, and in water purification.

The sorptive properties of the smectite clays for organic contaminants are greatly modified by replacing inorganic cations (e.g., $Na^+$, $Ca^{2+}$) with quaternary ammonium cations (QACs) of the form $[(CH_3)_3NR]^+$. Organo-clays formed using small QACs, e.g., where R is a methyl or a phenyl group, exhibit pore structure which result in appreciable surface areas of ~200 $m^2$/g. Recently, organo-clays, such as tetramethylammonium (TMA)- and trimethylphenylammonium (TMPA)-smectites, (Boyd, U.S. Pat. No. 5,268,109) have been characterized for their ability to remove various organic contaminants, such as benzene, alkylbenzenes, chlorinated phenols from water. Adsorption efficiencies were dependent on a number of factors. The size of the organic cation and the clay layer charge affected the surface area and pore structure of the organo-clays, and hence their adsorption efficiencies. Adsorption efficiencies also depended on the presence or absence of water. For instance, the adsorption of benzene, toluene and xylene vapors by the TMA-smectite was greater than their adsorption as solutes from water. Additionally, the adsorption of organic vapors by TMA-smectite was not strongly dependent on the size and shape of the adsorbate, whereas the extent of adsorption from water was significantly reduced as the size and shape of the adsorbate grew larger and bulkier. The lower adsorption efficiency of TMA-smectite in presence of bulk water was described as a water-induced sieving effect and attributed to shrinkage of the interlayer pore sizes by hydration of the TMA cations and/or aluminosilicate surfaces of the clay layers. Subsequent studies of the adsorption of organic contaminants from water by TMPA-smectites showed that the aluminosilicate surfaces are organophilic in nature and are the active adsorptive sites. Furthermore, unlike TMA-smectite, adsorption efficiencies of TMPA-smectite from bulk water were not strongly affected by adsorbate size and shape.

In accordance with the present invention, a new class of organo-clays, organo-phosphoniumsmectites (e.g., tetramethylphosphonium (TMP)- and trimethylphenylphoshonium (TMPP)-clays) have been found for the adsorption of organic contaminants in the form of both vapors and solutes dissolved in water. Unexpectedly, it has been found that ion-exchangeable clays, such as montmorillonites or smectites, particularly the bentonites that have $Na^+$, $K^+$, $Li^+$, $Mg^{2+}$ or $Ca^{2+}$ as their predominant exchangeable cations; as well as hectorite; saponite; nontronite; attapulgite; illite; zeolites; vermiculite, and the like, that are ion-exchanged with QPC ions comprised of four organic carbon moieties bonded to the central phosphorus atom including short chain alkyl moieties ($C_1$–$C_4$); long chain alkyl moieties ($C_4$–$C_{20}$), substituted or unsubstituted cycloalkyl; substituted or unsubstituted aryl or alkaryl moieties, e.g., benzyl or phenyl; alkenes, e.g., propene; aldehydes, e.g., acetaldehyde;

ketones, e.g., acetophenone; alcohols, e.g., isobutylalcohol; carboxylic acids, e.g., valeric acid; esters, e.g., methylacetate, and combinations thereof, effectively adsorb or otherwise remove aliphatic and aromatic organic contaminants (e.g., hydrocarbons, chlorinated hydrocarbons, phenols etc.,) from gases, e.g., air, and from water.

SUMMARY OF THE INVENTION

In brief, the present invention is directed to new and improved organophosphonium ion exchanged clays and to a method of removing organic contaminants from air and/or water, by contacting the contaminants in the air or water with an organophosphonium-clay that has been prepared by ion-exchange of ion-exchangeable clay with quaternary phosphonium cations (QPC) comprised of four organic carbon moieties bonded to the central phosphorus atom, selected from the group consisting of short chain alkyl moieties ($C_1$–$C_4$); long chain alkyl moieties ($C_4$–$C_{20}$); substituted alkyl, e.g., halogenated, short or long chain alkyl moieties; substituted or unsubstituted cycloalkyl; substituted or unsubstituted aryl or alkaryl moieties, e.g., benzyl or phenyl; alkenes, e.g., propene; alkynes; aldehydes, e.g., acetaldehyde; ketones, e.g., acetophenone; alcohols, e.g., isobutylalcohol; carboxylic acids, e.g., valeric acid; esters, e.g., methylacetate; ethers; cyclic ethers; and combinations thereof, for removing air-laden and water-laden organic contaminants. The new organo-clays and methods of the present invention are particularly adapted for removal of aromatic petroleum-based contaminants from water, such as benzene; toluene; alkyl benzenes, such as ethylbenzene; styrene; xylenes (o-, m- and p-isomers); and chlorinated hydrocarbon solvents, such as $CCl_4$.

Accordingly, one aspect of the present invention is to provide a new and improved organophosphonium-clay and improved method of removing organic contaminants from water by contacting the contaminant with a phosphonium ion-exchanged clay, wherein the ion-exchanged smectite clay includes QPC ions of the formula:

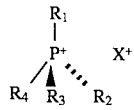

wherein $X^- = Cl^-$, $Br^-$ or $I^-$; wherein $R_1$, $R_2$, $R_3$ and $R_4$ are organic moieties, such as short chain alkyl moieties ($C_1$–$C_4$); long chain alkyl moieties ($C_4$–$C_{20}$); substituted alkyl, e.g., halogenated, short or long chain alkyl moieties; substituted or unsubstituted cycloalkyl; substituted or unsubstituted aryl or alkaryl moieties, e.g., benzyl or phenyl; alkenes, e.g., propene; alkynes; aldehydes, e.g., acetaldehyde; ketones, e.g., acetophenone; alcohols, e.g., isobutylalcohol; carboxylic acids, e.g., valeric acid; esters, e.g., methylacetate; ethers; cyclic ethers; and combinations thereof.

These and other aspects and advantages of the present invention will become more apparent from the following detailed description of the preferred embodiments, taken in conjunction with the drawings.

BRIEF DESCRIPTION OF THE DRAWINGS

FIGS. 2A, 2B, 26, 2D, 2E and 2F are graphs showing the sorption of benzene, toluene, ethylbenzene, styrene, o-xylene and $CCl_4$ from water by tetramethyl-phosphonium-(TMP) ion-exchanged smectite clay, tetramethylammonium-(TMA) ion-exchanged smectite clay, trimethylphenylphosphonium-(TMPP) ion-exchanged smectite clay, and trimethylphenylammonium-(TMPA) ion-exchanged smectite clay;

DETAILED DESCRIPTION OF THE PREFERRED EMBODIMENTS

Figure 1C:
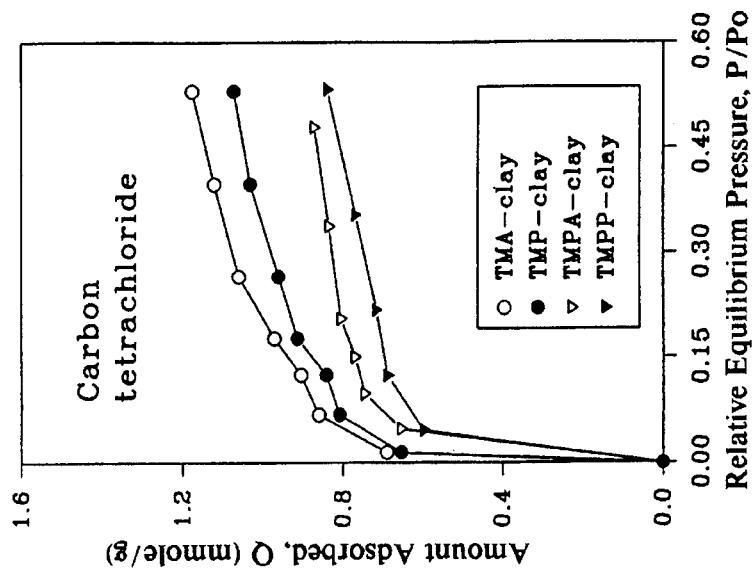
FIGS. 1A, 1B and 1C are graphs showing the vapor sorption of organic contaminants (benzene, toluene and $CCl_4$) by tetramethylphosphonium-(TMP) ion-exchanged smectite clay, tetramethylammonium-(TMA) ion-exchanged smectite clay, trimethylphenylphosphonium-(TMPP) ion-exchanged smectite clay and trimethylphenylammoniumo-(TMPA) ion-exchanged smectite clay.

The clays that can be ion-exchanged with the quaternary phosphonium cations (or QPC ions) disclosed herein can be any clay capable of sufficient ion-exchange with the QPC cations described to render the clays organophilic. Preferably, the clay that can be ion-exchanged with the QPC ions described herein include any water-swellable clay which will hydrate in presence of water, i.e., will swell in presence of water. In accordance with one important embodiment of the present invention, the clay is bentonite. A preferred bentonite is sodium bentonite which is basically a hydratable montmorillonite clay of the type generally found in the Black Hills of South Dakota and Wyoming. This clay has $Na^+$ as a predominant exchange ion. However, the bentonite utilized in accordance with this embodiment of the present invention may also contain other cations such as $Li^+$, $K^+$, $Ca^{2+}$, $NH_4^+$, $Mg^{2+}$, with this embodiment of the present invention may also $Fe^{2+0}$ or $Fe^{3+}$.

There are cases wherein a montmorillonite with this embodiment of the present invention may also predominant in $Ca^{2+0}$ ions can be converted to a high with this embodiment of the present invention may also swelling $Na^{+0}$ variety through a well-known process called "peptizing." The clay utilized in this invention may be one or more peptized bentonites. The clay may also be any member of the dioctahedral or trioctahedral smectite group or mixtures thereof. Examples are beidellite, nontronite, hectorire and saponite. Attapulgite, illite and vermiculite may also be useful in accordance with the present invention. To achieve the full advantage of the present invention, the colloidal clay, e.g., bentonite, generally is finely divided as known for use in water barrier panels and like, i.e., 150 to 350 mesh.

The cation exchange capacities (CECs) of these clays are well known and sufficient QPC-ion liberating compound is dissolved in aqueous solution in contact with a pulverized or otherwise finely divided colloidal clay in aqueous suspension to achieve sufficient QPC cation exchange to render the clay organophilic. Sufficient time is allowed for complete cation exchange, e.g., 30 minutes to 24 hours, with 2 to 4 hours being a sufficient time for complete cation exchange for most clays. After cation exchange, any unbound QPC cations and their companion anions, any precipitated salts, and cations removed from the clay in the cation exchange are removed by filtration, dialysis or the like, and the organo-clay is washed in water, e.g., distilled water. For storage purposes, the resulting organophilic ion-exchanged clay can be frozen and/or freeze dried, air dried, or oven dried.

For purposes of removing organic contaminants from gases, such as air, and from water, it has been found that excellent results are achieved with a QPC ion of the formula:

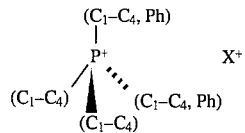

wherein $X^- = Cl^-$ or $Br^-$, and Ph denotes phenyl, for example, tetramethylphosphonium chloride or bromide, tetrapropylphosphonium chloride or bromide, tetrabutylphosphonium chloride or bromide, trimethylethylphosphonium chloride or bromide, or any other combination of $C_1-C_4$, and phenyl radicals capable of synthesis. The particular anion ($X^-$) associated with the QPC cation is of no significant consequence in the ion-exchange reaction with the clay.

Another QPC ion that, when ion exchanged onto a smectite clay, is excellent for removal of gas-laden or water-laden organic contaminants, is as follows:

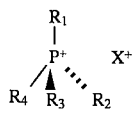

wherein $X^- = Cl^-$ or $Br^-$, wherein Ph denotes phenyl; $R_1$, $R_2$, $R_3$ and $R_4$ are organic moieties, such as short chain alkyl moieties ($C_1-C_4$); long chain alkyl moieties ($C_4-C_{20}$); substituted alkyl, e.g., halogenated, short or long chain alkyl moieties; substituted or unsubstituted cycloalkyl; substituted or unsubstituted aryl or alkaryl moieties, e.g., benzyl or phenyl; alkenes, e.g., propene; alkynes; aldehydes, e.g., acetaldehyde; ketones, e.g., acetophenone; alcohols, e.g., isobutylalcohol; carboxylic acids, e.g., valeric acid; esters, e.g., methylacetate; ethers; cyclic ethers; and combinations thereof. With respect to each of these moieties $R_1$, $R_2$, $R_3$, and $R_4$, the cycloalkyl and aryl moieties can have from three to about seven carbon atoms. The aryl moiety of the substituted and unsubstituted aryl and/or alkaryl moieties can be, for example, phenyl, napthenyl, trienyl, pyridyl, pyrolyl, pyridyl, furyl, pyrazolyl, pyridazinyl, pyrimidyl, quionolyl, isoquinolyl, acridinyl and similar five- and six-membered carbocyclic and heterocyclic aromatic compounds and wherein the alkaryl moiety is benzyl, 2-phenylethyl and similar aryl-substituted alkyl groups including from one to about four carbon atoms; and wherein the aryl or alkaryl moiety is substituted with a functionality such as, for example, hydroxy (—OH); alkoxy ( —OR"); alkyl (—R"); halo (—X); amino (—NH$_2$, —NHR", —NR$_2$); nitro (—NO$_2$); cyano (—CN); alkyl sulfonyl (—SO$_2$R"); mercapto (—CH); alkylthio (—SR"); carbonyl functionalities having the formula —CO—Y, where Y is hydrogen, hydroxy, alkoxy, halo, amino, or alkyl, and combinations thereof, wherein R" is an alkyl group including from one to about twenty carbon atoms and $X^-$ is $Cl^-$, $Br^-$ or $I^-$.

Diphosphonium ion-exchanged smectite clays also are useful for adsorbing organic contaminants from gases, such as air, and from water. The exchanged diphosphonium ions have a general formula:

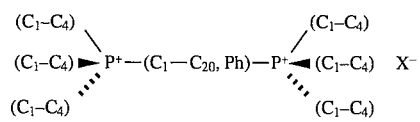

wherein $X^- = Cl^-$, $Br^-$ or $I^-$, and Ph denotes phenyl, such as decyltrimethyldiphosphonium (DTMDP) ion:

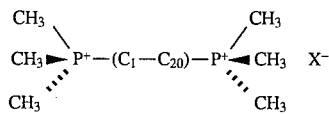

wherein $X^- = Cl^-$, $Br^-$ or $I^-$.

Organo-Clay Syntheses

A Wyoming montmorillonite, reference clay SWy-1, was obtained from the CMS source Materials Repository at the University of Missouri, Columbia, Mo. The CEC of this clay is 76.4 meq/100 g. A <2 µm, Na$^+$-saturated homoionic clay fraction was obtained by stirring ~10 g of the reference clay with ~1 L of 1M NaCl solution overnight, followed by centrifugation at 500 to 600×g, then replacing the supernatant NaCl with a fresh solution. This sequence was repeated three times after which the clay was washed with distilled water and centrifuged until the supernatant was Cl$^-$ free, as indicated by AgNO$_3$. The Na$^+$-saturated clay was then wet sedimented to obtain <2 µm fraction. The <2 µm fraction was stored as ~1 wt. % suspension for further use.

Four different organo-clays were synthesized by exchanging the interlayer Na$^+$ cations with tetramethylammonium (TMA) chloride (Kodak) or tetramethylphosphonium (TMP) bromide (Aldrich) or trimethylphenylammonium (TMPA) bromide (Aldrich) or trimethylphenylphosphonium (TMPP) iodide salts, designated as TMA-, TMP-, TMPA- and TMPP-clays, respectively. TMPP+I$^-$ salt was prepared by reacting a solution of dimethylphenyl phosphine (0.176 mol) in 500 mL ethanol solution with 0.387 mol of methyl iodide. Organo-clays were synthesized by adding ~300 mL of salt solutions to ~700 mL of ~1 wt. % Na$^+$-saturated clay suspension which was being stirred at room temperature. The salt solutions were added in an amount corresponding to ~5 times the CEC of the clay over a period of 5–10 minutes. The reaction mixtures were left stirring overnight (12 to 16 h), then centrifuged several times with distilled water until the supernatant was Cl$^-$ or Br$^-$ or I$^-$ ion-free, as indicated by AgNO$_3$. The resulting organo-clays were quick-frozen and freeze-dried.

Physical Characterization

Interlayer spacings were determined for oriented clay films using X-ray powder diffraction (XRD). Oriented specimens were obtained by spreading a few drops of freshly sonicated organo-clay suspension (~1 to 2 wt. %) on glass microscopic plates and letting the plates dry at room temperature. XRD patterns were recorded using a CuK$_\alpha$ radiation on a Rigaku diffractometer equipped with a rotating anode.

Surface area measurements were carried out at liquid N$_2$ temperatures (77K) on a Coulter Omnisorb 360CX sorptometer. TMA- and TMP-clays were degassed at 120° C. for ~12 hours at ~10$^{-4}$ Torr whereas TMPA- and TMPP-clays were degassed at ~75° C. for ~12 hours at ~1 Torr. Surface areas were calculated using the BET equation.

Organic carbon contents were determined using a Dohrmann DC-190 high temperature TOC analyzer (Rosemont Analytical Inc., Calif.).

Sorption of Vapors

The NOCs used in this study (benzene, toluene, ethylbenzene, o-xylene, styrene) and $CCl_4$ were obtained from Aldrich Chemical Company as either HPLC grade or 99+% pure, and used without further purification. Saturated vapor pressures (Po) and water solubilities of organic compounds are shown in Table 1. Vapor sorption studies of water, benzene, toluene, and CCl4 by the degassed organo-clays were obtained at ambient temperature using a McBain balance sorptometer. Degassed samples (described below) are hereafter referred to as dry samples. McBain balance sorptometer was comprised of four quartz weighing pans suspended by quartz springs in a glass manifold equipped with a pressure gauge and outlets for a vacuum pump, and to introduce vapors into the manifold. Spring constants of the quartz springs were determined employing standard weights. A spring displacement of 1 mm corresponded to a 5 mg weight change. A traveling microscope was employed to register the displacement of the spring. Organo-clays (~200 to 300 mg) were loaded into the weighing pans. Heating jackets were used to heat the manifold at 125°–150° C. overnight at pressures of $\leq 0.1$ Torr. After heating, the manifold was cooled to room temperature and samples were then exposed incrementally to vapors at different pressures. Equilibrium pressures were attained within 2 to 6 hours, dependent upon the adsorbate and adsorbent pair.

Adsorption isotherms were constructed by plotting the amounts sorbed (Q, mmole/g) vs. the relative equilibrium vapor pressure (P/Po). The amount adsorbed by the organo-clays was estimated from the difference between the weight of the dry sample and the weight of the sample at a particular P/Po. The average of duplicate samples was plotted for each point in the presented isotherms. The difference between duplicates was generally $\leq 3\%$.

Adsorption of Solutes From Water

Adsorption isotherms were carried out using the batch equilibration technique. For each isotherm, ~50 to 150 mg of the organo-clay were weighed into 25 mL Corex centrifuge tubes, and 25 mL of deionized water added. To these suspensions, different amounts of each compound were added using Hamilton microliter syringes to give relative equilibrium concentrations (concentration in water/water solubility, Ce/Cs) between <0.05 to ~1. Benzene and $CCL_4$ were delivered as neat liquids, and the other adsorbates were delivered as methanol solutions. Immediately after injection of the compound the Corex tubes were topped with teflon disks, closed with screw tops and shaken for $\geq 24$ hours at room temperature on a reciprocating shaker. Kinetic investigations have earlier indicated that the sorption equilibriums were attained in less than 20 hours. After $\geq 24$ hours of reaction, the aqueous phase was separated by centrifugation for 10 to 15 minutes at 1075×g at ambient temperature. A 10 mL portion of the supernatant was extracted with 10 mL of 99+% grade carbon disulfide (Aldrich) solvent. A portion of the carbon disulfide extract was then analyzed using gas chromatography (GC).

Adsorption isotherms were constructed by plotting the amounts sorbed (Q, mmole/g) vs. the concentration remaining in the solution (equilibrium concentration, Ce, mmole/L). The amount sorbed by the organo-clay was determined from the difference between the amount of adsorbate added and the Ce. Experiments were carried out in duplicate and the average of duplicate samples was plotted in the presented isotherms. The difference in Ce between the duplicates samples was generally $\geq 3\%$. Recoveries in blank (organo-clay free) samples prepared as described above were 90 to 95%. The data were not adjusted for these recoveries.

Gas chromatography was carried out using a 5890A Hewlett Packard (HP) gas chromatograph and a flame ionization detector (FID). A 25% sorbital coated on a 80–100 mesh Chromosorb Q11 packed column attached to a 10% SP-2100/bentonite 34 coated on 80–100 mesh Supelcoport packed column was used for separations. High purity $N_2$ gas was used as a carrier gas (30–40 mL/min). A HP3392A integrator was employed for peak area calculations and a HP7673A automatic sample changer was used to automate runs.

Data Analysis

Adsorption data were fitted to the Langumir equation. Monolayer volumes, $V_m$, (number of mmoles of adsorbed compound per g of organo-clay at monolayer coverage), were derived by curve-fitting the experimental data to the Langumir equation employing the SigmaPlot program. Adsorptions consistent with the Langumir model yield $R^2$ (measure of linearity) values of >0.97. $R^2$ values were obtained employing the linear form of the Langumir equation.

Results

The organic carbon (OC) contents, $N_2$ BET surface areas, and XRD interlayer spacings, and CECs of the air-dried reference SWy-1, and the freeze-dried TMA-, TMP-, TMPA- and TMPP-clays are shown in Table 2. The measured OC contents of the organo-clays suggest that the TMA and TMP cations are exchanged to similar extents. Also, like the TMA and TMP cations, the exchange of the TMPA and TMPP cations is similar. These data indicate that the organic cations (QACs and QPCs) have replaced nearly all the $Na^+$ cations of the reference clay in all the organo-clays studied. Increases in the surface area from 32 to >100 $m^2/g$, and the interlayer spacings from 9.4 to >15.0 A confirm exchange of the interlayer $Na^+$ cations by the QAC and QPC ions. Also, the observation of type I $N_2$ adsorption isotherms, characteristic of micropores (pores <10.0 Å), further substantiate exchange of the organic cations.

A 0.42 Å interlayer spacing difference between the TMA- and TMP-clays, and an interlayer spacing difference of 0.13 Å between the TMPA- and TMPP-clays (Table 2), are in agreement with an expected difference of 0.56 Å interlayer spacings based on the ionic radii of N(III) and P(III) ions.

Vapor Sorptions

Figure 1B:
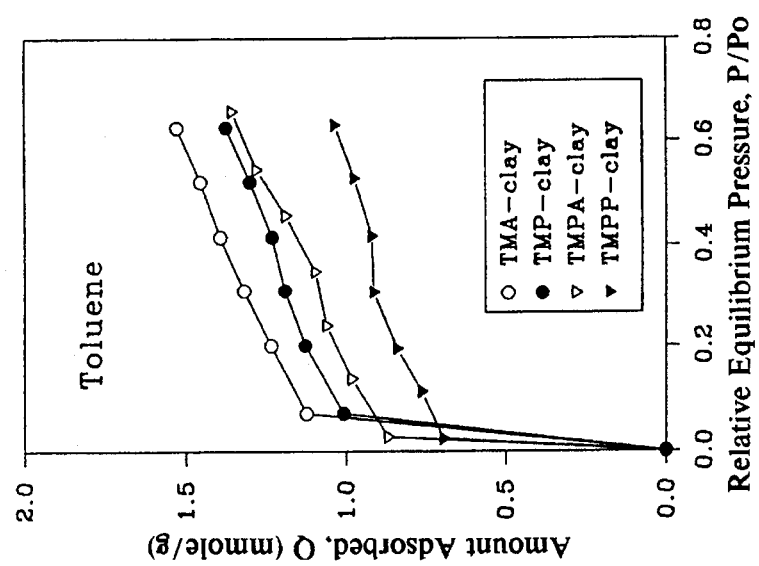
Figure 1A:
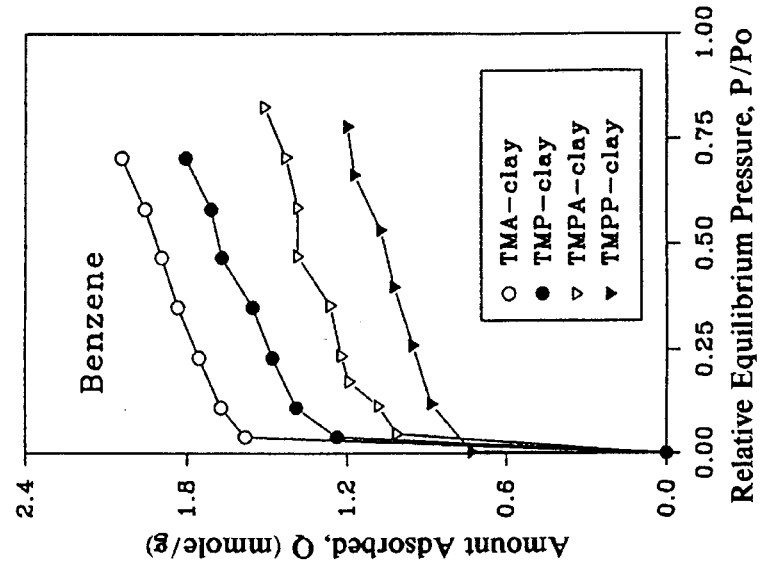

Langumir or type I adsorption isotherms ($R_2$>0.97) were observed, irrespective of the size and shape of the adsorbate, for planar benzene, nonplanar toluene and nonplanar, tetrahedral, "spherical" $CCl_4$ molecules on all the dry organo-clays (FIG. 1). In other words, the sorption efficiency was not strongly dependent upon the size and shape of the adsorbate. Langumir adsorption isotherms indicated that sorption occurred predominantly in the interlayer micropores of all the organo-clays, apparently on the mineral surfaces between the onium ions. Monolayer volumes, $V_m$, (number of mmoles of the adsorbed compound per g of organo-clay at monolayer coverage), are presented in Table 3. It is evident from the table 3 that for all the adsorbates studied: (a) the sorption efficiency is in part proportional to the $N_2$ BET surface areas of the organo-clays (Table 2). For example, TMA-clay, the higher surface area solid, exhibited higher adsorptions, and (b) the sorption efficiency decreases slightly with increasing the size and shape of the adsorbate molecule from benzene to toluene to $CCl_4$.

Finally, it is interesting to note the presence of Langumir isotherms for $CCl_4$ (FIG. 1C). Carbon tetrachloride is a tetrahedral molecule with a molecular size or critical dimension of 6.65 Å. In comparison, the organo-clays have an interlayer spacings of 4.5 to 5.5 Å indicating that $CCl_4$ molecules expanded the interlayer spacings, confirming interlayer adsorption.

Adsorption of Solutes From Water

Adsorption of planar molecules, such as benzene and styrene; nonplanar molecules, for e.g., alkylbenzenes, such as toluene, ethylbenzene, and o-xylene; and nonplanar, tetrahedral molecule $CCl_4$, as solutes from water were compared with vapor sorptions to understand the effect of organic cation type and the role of bulk water on the adsorption efficiency.

Figures 2A, 2B:
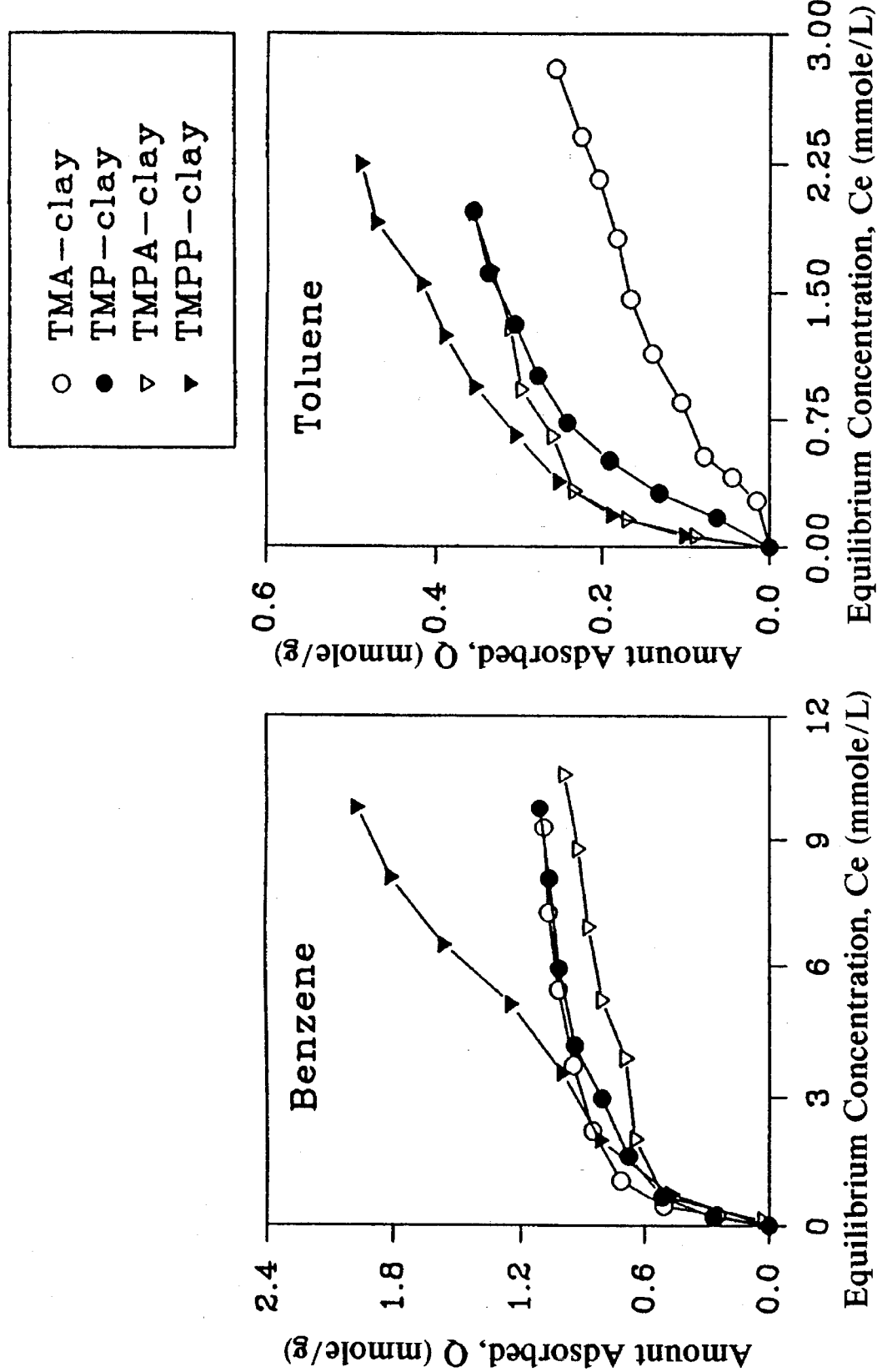

Adsorption of organic solutes from water by organo-clays exhibited characteristics distinct from their adsorption as vapors by dry organo-clays. Adsorptions were found not proportional to the $N_2$ BET surface areas, in direct contrast to the vapor phase sorptions. For example, in case of toluene adsorption (FIG. 2B), TMP-clay exhibited higher adsorptions than the TMA-clay as indicated by $V_m$ values listed in Table 3, in spite of the lower surface area of the TMP-clay (Table 2). Similarly, TMPP-clay exhibited higher adsorptions than the TMPA-clay (Table 3).

Figure 2D:
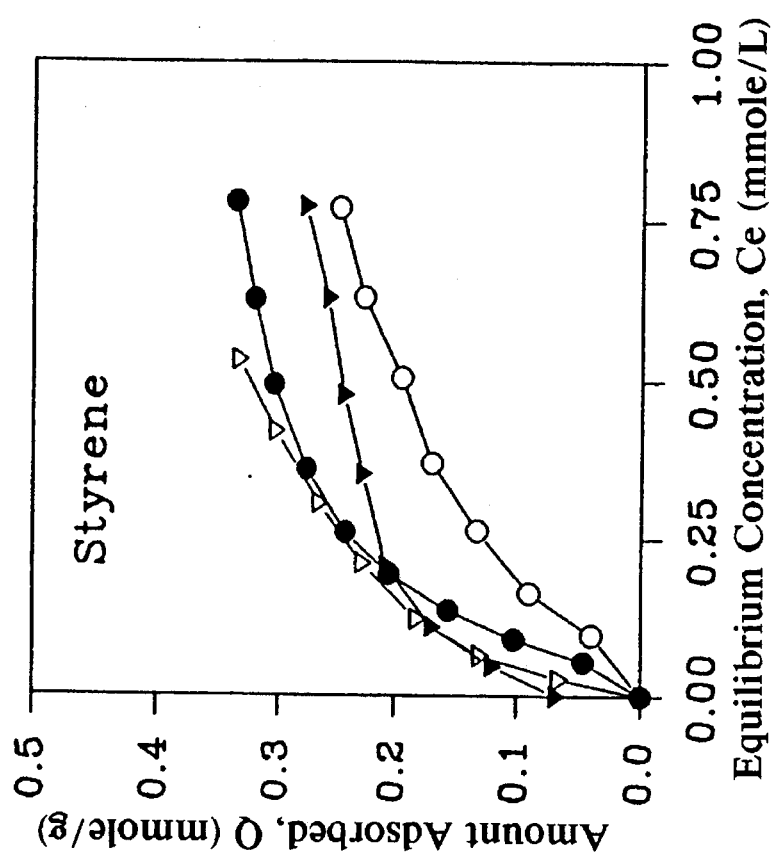
Figure 2C:
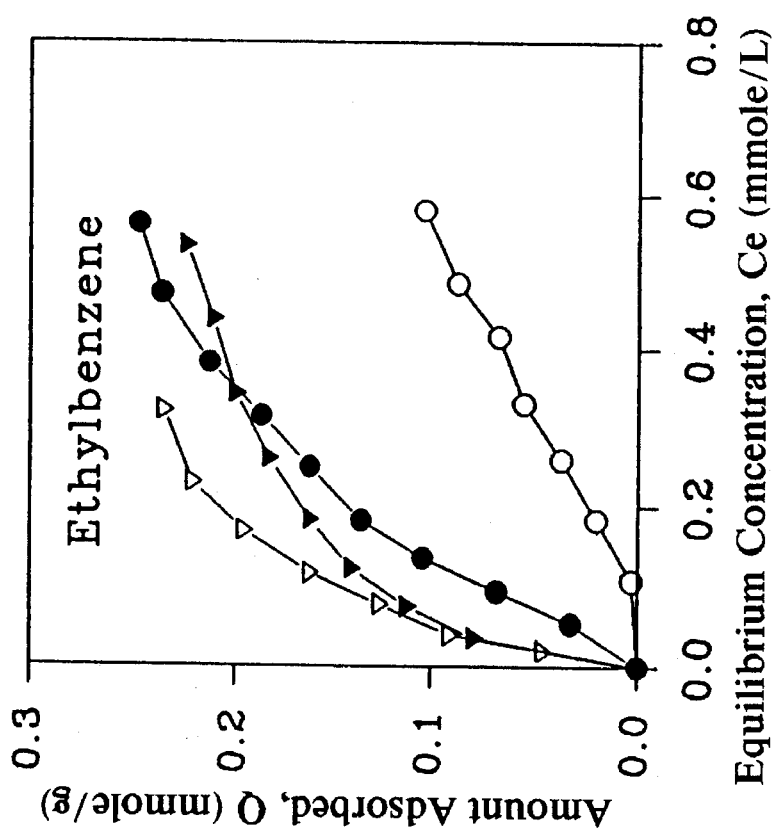

Adsorbate size and shape had a pronounced effect on the adsorption efficiency of solutes from water by TMA-clay. This is in contrast to the adsorption of solutes from water by the TMP-, TMPA- and TMPP-clays, and the TMA- and the adsorption of organic vapors by all the organo-clays studied. For TMA-clay, planar molecules, such as benzene and styrene (FIGS. 2A, 2D) and the nonplanar tetrahedral molecule $CCl_4$ (FIG. 2E) were adsorbed in the interlayer pores, manifesting Langumir isotherms. In contrast, larger nonplanar molecules, such as toluene (FIG. 2B), ethylbenzene (FIG. 2C) and o-xylene (FIG. 2F) exhibited non-Langumir isotherms suggesting that the interlayer pores were not large enough to fully accommodate the adsorbates. These results indicate that the interlayer pore structure of the TMA-clay was modified by water to greater extent than other the organo-clays.

In direct contrast to sorptive behavior of the quaternary ammonium clays, adsorbate size and shape had a very little or no effect on the organo-clays derived from the quaternary phosphonium cations, TMP- and TMPP-clays. This was evident from the Langumir isotherms (FIG. 2: except in case of o-xylene adsorption on TMP-clay, FIG. 2F), and sorptions being proportional to the solubility of the solute in the water. Sorption by the TMA-clay is strongly dependent on adsorbate size and shape and hence only the planar aromatic molecules, benzene and styrene were effectively adsorbed. TMPA-clay is somewhat sensitive to the size and shape of the adsorbate. For example, it exhibited higher sorption of the planar molecule styrene than the nonplanar molecule toluene, as observed in the TMA-clay (Table 3), and a non-Langumir o-xylene adsorption (FIG. 2F). These results indicated that in presence of water, the sizes of the interlayer pores of TMA- and TMPA-clays are smaller than those of TMP- and TMPP-clays. Finally, it was evident from the FIG. 2F that TMPP-clay is the only organo-clay with Langumir isotherm for o-xylene molecule. This suggests that the TMPP-clay pore structure is modified by water to a lesser extent than the others.

Figure 3:
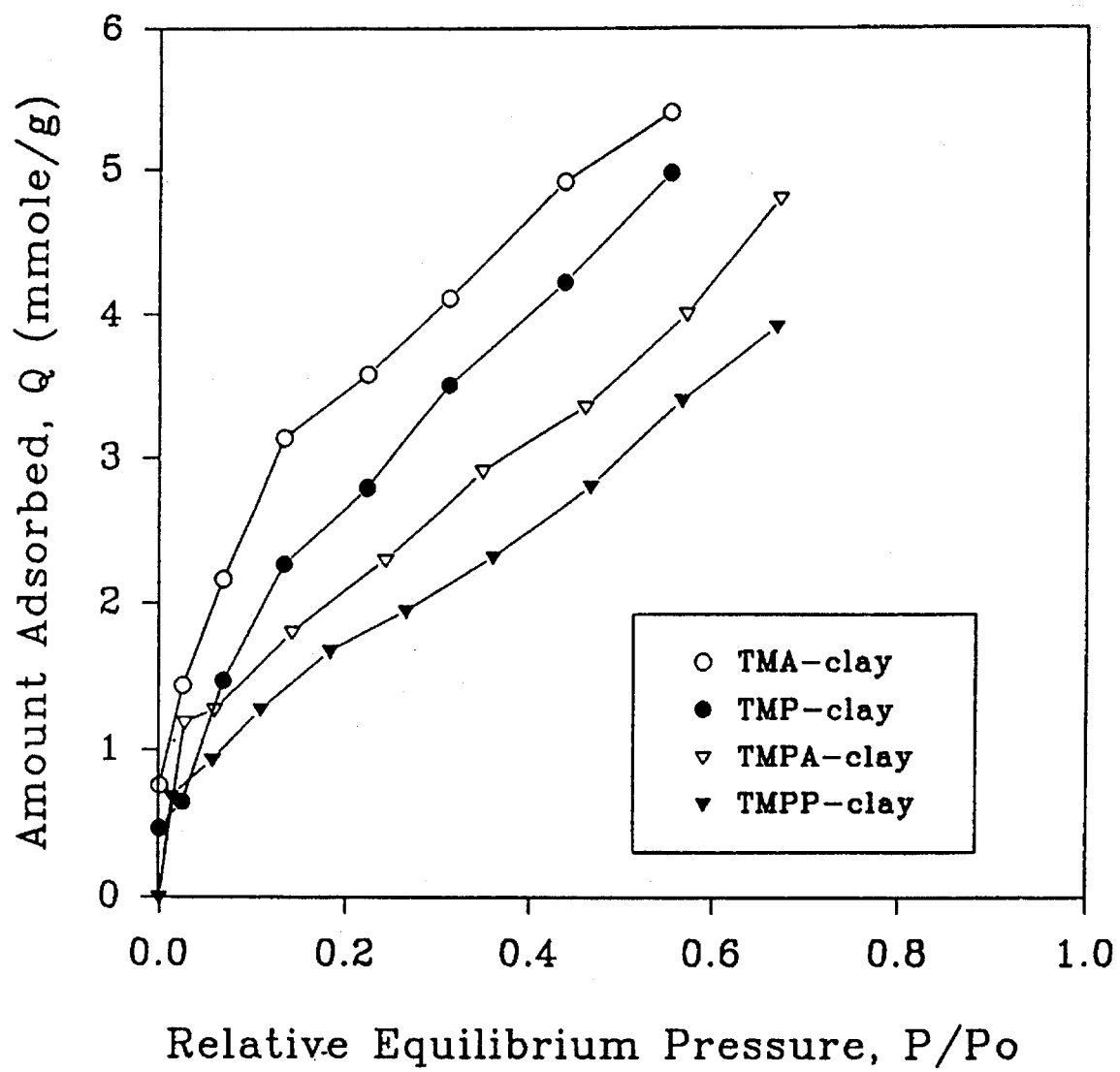
FIG. 3 is a graph showing the water vapor adsorption isotherms of tetramethylphosphonium-(TMP) ion-exchanged smectite clay, tetramethylammonium-(TMA) ion-exchanged smectite clay, trimethylphenylphosphonium-(TMPP) ion-exchanged smectite clay, and trimethylphenylammonium-(TMPA) ion-exchanged smectite clay.

Water adsorption isotherms of organo-clays are shown in FIG. 3. Isotherms are type II in nature, similar to a TMA-clay derived from Upton Wyoming bentonire. Water sorption efficiency decreases in the order TMA-clay>TMP-clay>TMPA-clay>and TMPP-clay. The higher uptake of water by the TMA-clay than TMP-clay, and the TMPA-clay than TMPP-clay, is in accordance with ~20 kcal/mole higher hydration energy of the $NH_4+$ cation than the $PH_4+$ cation. The higher uptake of water by the TMA-clay than TMPA-clay, and the TMP-clay than TMPP-clay, is due to the presence of four methyl moieties on TMA and TMP cations vs. three methyl moieties and a phenyl moiety on TMPA and TMPP cations. Phenyl moiety being relatively more organaphilic in nature than a methyl moiety makes TMPA- and TMPP-clays relatively more hydrophobic in nature than the corresponding tetramethylated ammonium- and phosphonium-ion exchanged organo-clays. Of the four organo-clays evaluated the TMPP-clay is relatively more organophilic in nature or adsorbs less water than the other organo-clays due to the combined effect of having P(III) cation at the center of the tetrahedron and due to the presence of the phenyl moiety. To conclude, water adsorption data indicate that organo-clays derived from QPC ions are relatively more organophilic than the organo-clays derived from QAC ions, and the organo-clays with the interlayer organic cations comprised of methyl and phenyl moieties are more organophilic than the organo-clays with only methyl moieties.

Figure 4A:
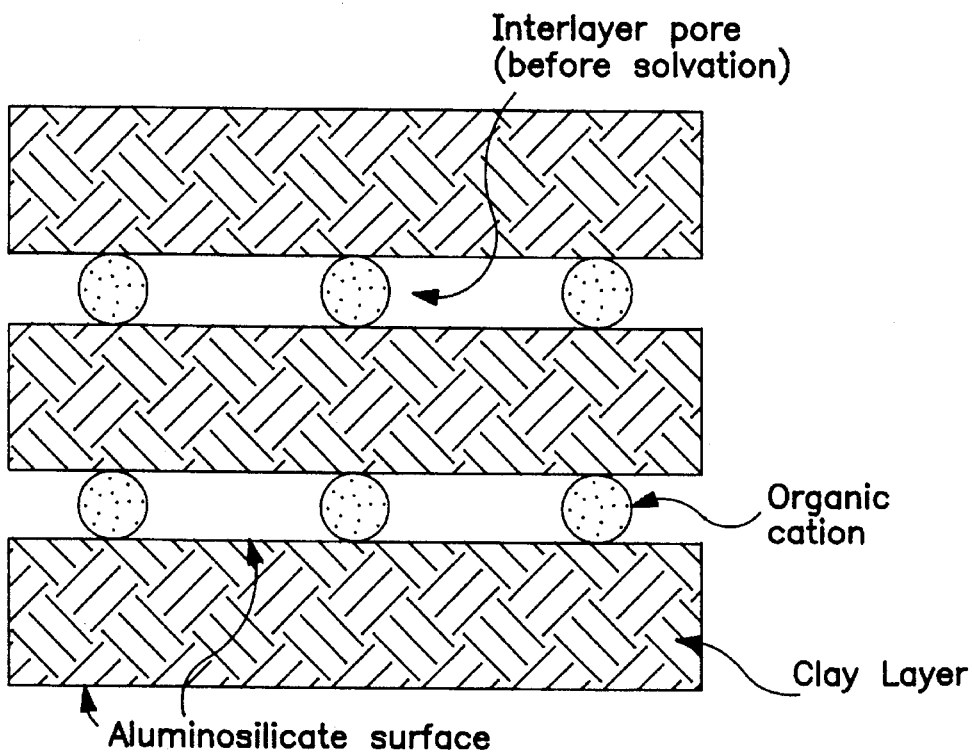
FIGS. 4A and 4B are schematic representations of organo-clay layers in absence and presence of water.
Figure 4B:
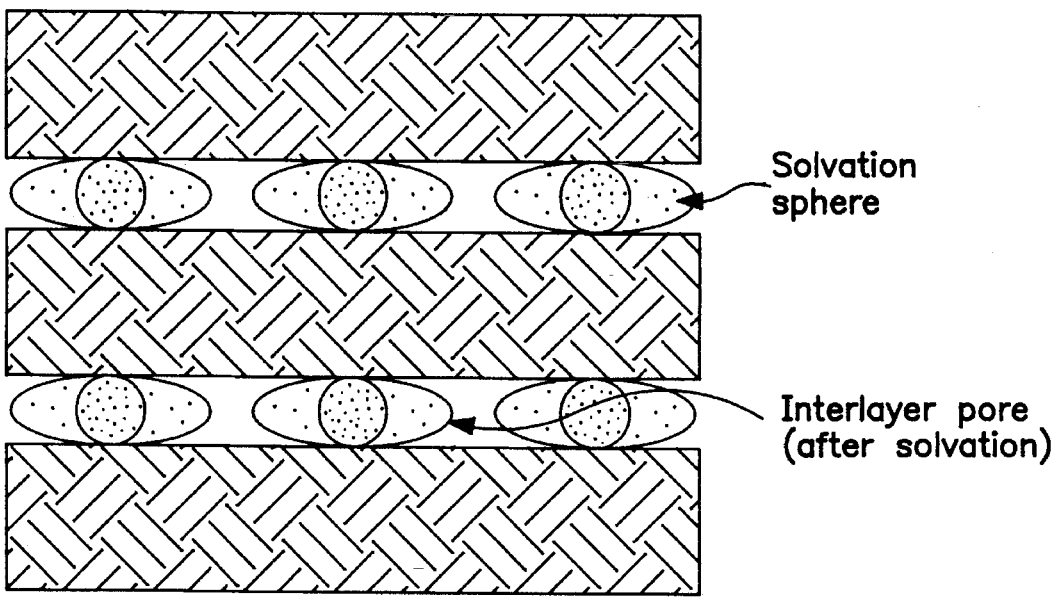
Figure 5:
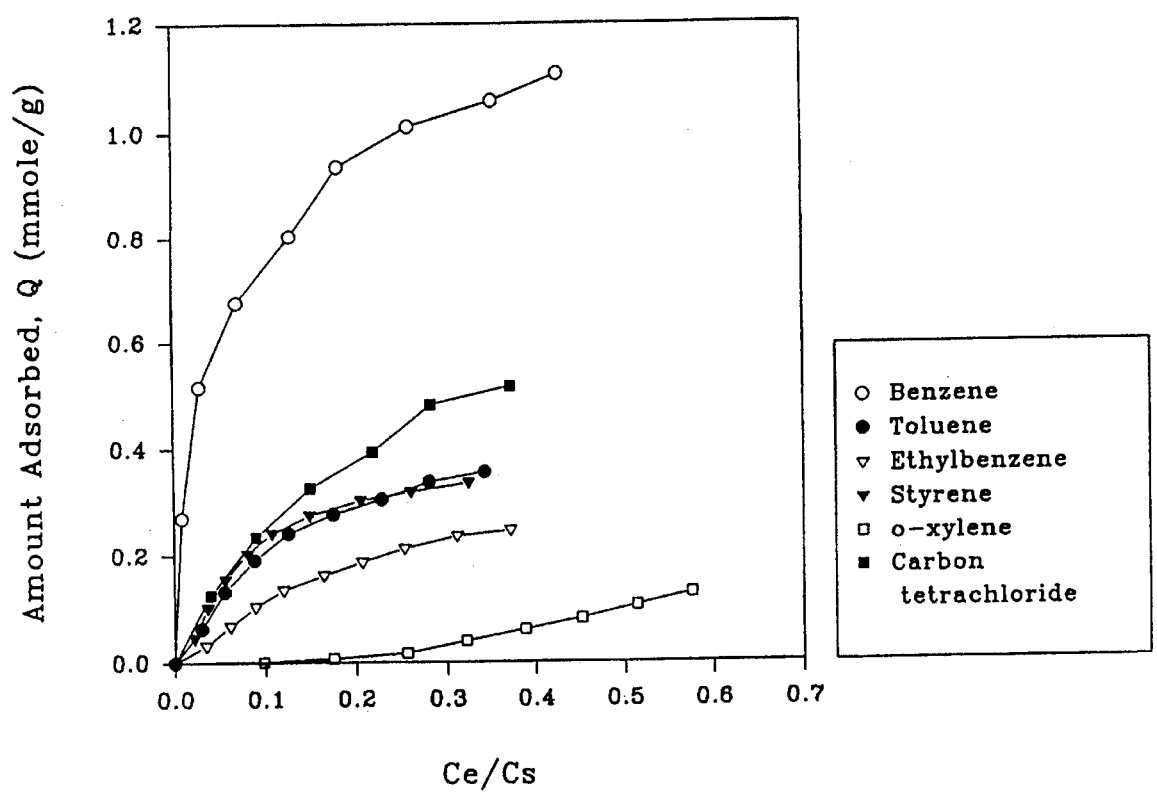
FIG. 5 is a graph showing adsorption isotherms of benzene, $CCl_4$, toluene, styrene, ethylbenzene and o-xylene solutes from water by TMP-smectite expressed in terms of reduced concentration (Ce/Cs)
Figure 6:
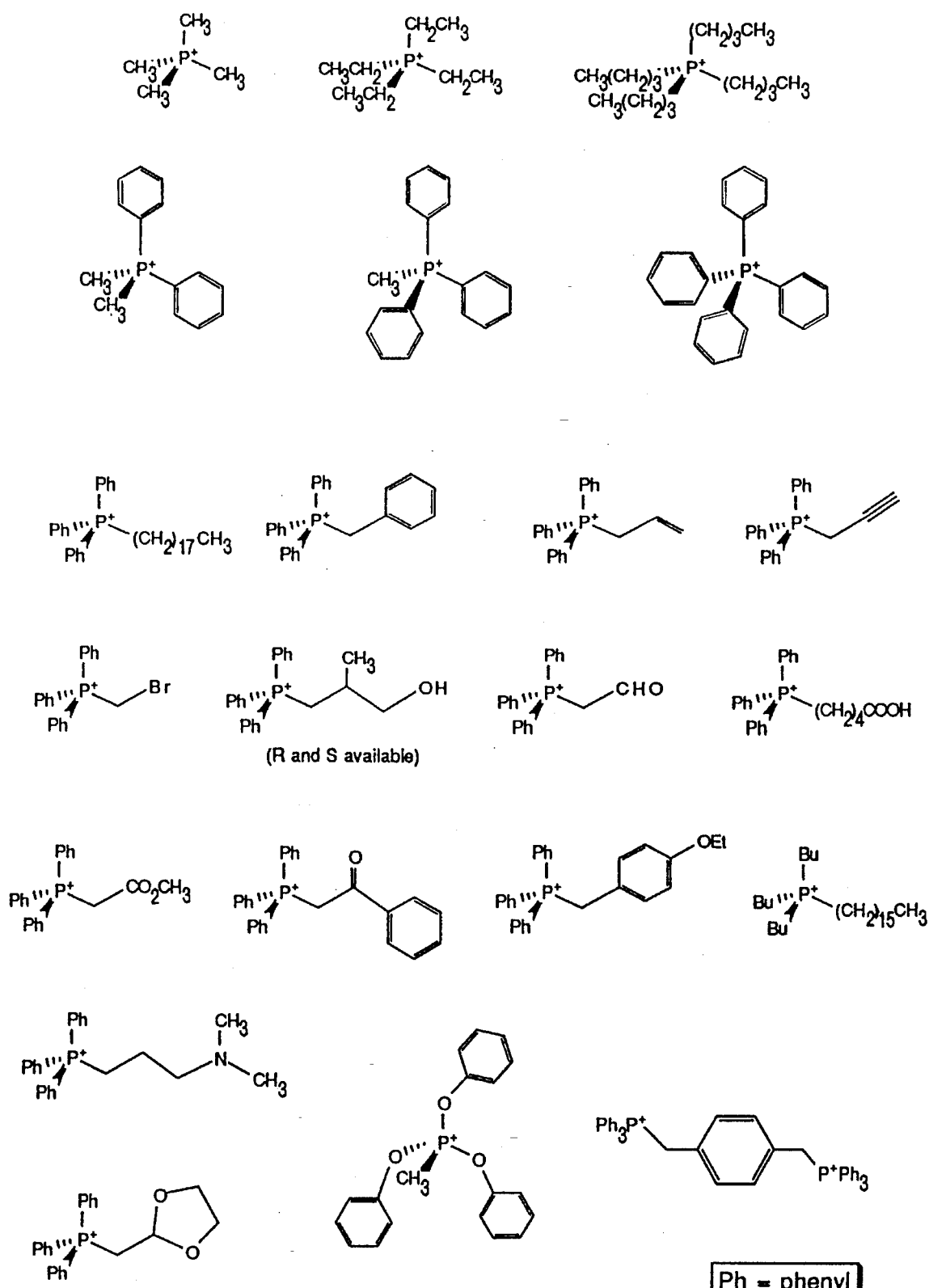
FIG. 6 shows the chemical structure of some of the quaternary phosphonium ions exchangeable with smectite clays in accordance with the present invention.

The higher sorption by TMP-clay as compared to TMA-clay, and TMPP-clay as compared to TMPA-clay, appears to be related to the degree of cation hydration, and not directly to the interlayer spacings which are very similar or total surface areas of the organo-clays. Solvation of interlayer cations would decrease or shrink the effective "pore" size of the organo-clays, i.e., the sorptive sites between onium pillars would be smaller in the presence of water than those that exist in the dry organo-clays. A schematic representation of clay platelets, and theorized adsorption behavior of the organo-clays in presence and absence of water is shown in FIG. 4. As a result of decrease in the pore size, sorption of organic molecules as solutes from water is generally less than the corresponding sorption of vapors. This is evident when adsorption isotherms from water are expressed in terms of reduced concentration, $Ce/Cs$, (where $Ce$ and $Cs$ are equilibrium concentration and water solubility of the solute respectively) and compared with vapor phase sorptions. For example, adsorption isotherms of TMP-clay from water expressed in terms of reduced concentration are shown in FIG. 5. Comparisons of FIGS. 1 and 5 show that at $P/Po$ and $Ce/Cs=0.4$ the amount of benzene adsorbed by TMP-clay as vapor and from water was 1.56 and 1.08 mmole/g, respectively. The plots of reduced concentration also suggest that the adsorption efficiency decreases with an increase in the size and shape of the adsorbate. Decrease in the adsorption efficiency with an increase in the size and shape of the adsorbate is also evident from the monolayer volumes, $V_m$, listed in Table 3.

Although sorption efficiency of all the organo-clays was reduced in the presence of bulk water, the extent of reduction was much less in the organo-clays derived from QPC ions, i.e., TMP- and TMPP-clays, than the organo-clays derived from QAC ions, especially TMA. In case of TMP- and TMPP-clays (except o-xylene adsorption on TMP-clay), the Langumir isotherms observed for all adsorbates suggest that the pores are large enough, even in presence of water, to accommodate both compact planar molecules like benzene and styrene, and bulkier substituted benzenes. Although, TMPA-clay, exhibits Langumir-type isotherms, and comparable adsorption efficiencies as TMP- and TMPP-clays, it is some what sensitive to the size and shape of the adsorbate, as illustrated by the absence of the Langumir type of isotherm for nonplanar toluene and the presence of the Langumir type of isotherm for the planar styrene molecule. Finally, the absence of the Langumir type of isotherms for the sorption of toluene, ethylbenzene and o-xylene from water by TMA-clay, indicates that the hydration sphere around the TMA cations is large enough to shrink the size of pores to dimensions that exclude these solvents, but remain large enough to accommodate benzene, styrene and $CCl_4$.

The comparative study of adsorption of organic contaminants by organo-clays derived from organic cations with P(III) and N(III) ions at the center of the tetrahedron, and cations with and without a phenyl moiety instead of all four methyl moieties suggest the following conclusions: (1) Adsorption of organic vapors by dry organo-clays decreases in the order TMA-clay>TMP-clay>TMPA-clay>and TMPP-clay, and is found in part proportional to the $N_2$ BET surface area of the organo-clay; (2) Organic vapor adsorption occurs predominantly in the interlayer pores, irrespective of the size and shape of the adsorbate; (3) Adsorption properties of the organo-clays are modified in presence of bulk water due to the modification of interlayer pore structure. Pore modification results from solvation of interlayer QAC and QPC cations by water causing the effective "pore" sizes to become smaller than in the corresponding dry organo-clays; (4) The nature of interlayer cation, specifically its hydration energy, plays an important role in the adsorbative behavior of organo-clays in the presence of bulk water. Adsorption efficiency appears to decrease with an increase in the hydration energy of the cation. Organic cations, TMP and TMPP, apparently have lower hydration energies and hence are solvated with water to a lesser extent than the corresponding organic cations, TMA and TMPA. This is by virtue of P(III) ion having less hydration energy than N(III) ion; (5) TMPA and TMPP cations are more organophilic than the corresponding TMA and TMP cations due to the presence of a phenyl moiety, and thus are solvated to lesser extent than the corresponding nonphenyl-substituted cations; (6) The lower degree of solvation of TMP, TMPA, and TMPP cations than the TMA cation manifest larger effective "pore" sizes in these clays, and hence are more effective adsorbents for removing organic contaminants including bulkier nonplanar adsorbates like toluene, ethylbenzene etc., from water; (7) TMPP-clay is relatively more organophilic in nature due to the presence of P(III) cation at the center of tetrahedron and due to the presence of a phenyl moiety, and thus is found to be the most effective adsorbent for removal of all the adsorbates studied, irrespective of the size and shape of the adsorbate.

TABLE 1

Physical Characteristics of Organic Compounds

| Adsorbate | Solubility[1] (mg/L, 25° C.) | Sat. Vap. Press.[1] (mm Hg, Po. 25° C.) |
|---|---|---|
| Benzene | 1770 | 95.2 |
| $CCl_4$ | 1200 | 114.0 |
| Toluene | 530 | 28.5 |
| Styrene | 250 | —[2] |
| Ethylbenzene | 160 | —[2] |
| o-xylene | 180 | —[2] |
| Water | — | 22.8 |

[1]Data obtained from CRC Handbook of Chemistry and Physics.
[2]Vapor adsorptions of these NOCs were not carried out.

TABLE 2

Properties of Parent Application Clay and Organo-clays

| Clay/ Organo-clay | Interlayer Spacing,[1] Å | Surface Area,[2] (m²/g) | OC content (wt. %) |
|---|---|---|---|
| SWy-1 | 9.40[3,4] | 32[4] | — |
| TMA-clay | 13.94 | 207 | 3.86 |
| TMP-clay | 14.37 | 186 | 3.84 |

TABLE 2-continued

Properties of Parent Application Clay and Organo-clays

| Clay/ Organo-clay | Interlayer Spacing,[1] Å | Surface Area,[2] (m²/g) | OC content (wt. %) |
|---|---|---|---|
| TMPA-clay | 15.04 | 110 | 8.40 |
| TMPP-clay | 15.27 | — | 7.34 |

[1]Average of d(001) to d(005) reflections.
[2]From $N_2$ BET.
[3]Approximate interlayer spacing of an air-dried clay.
[4]Data obtained from van Olphen, H. and Fripiat, J. J. (1979).

TABLE 3

Calculated Monolayer Volumes, $V_m$, (mmole/g), of various Organic Compounds

| Adsorbate | TMA-clay | TMP-clay | TMPA-clay | TMPP-clay |
|---|---|---|---|---|
| Vapor Adsorptions | | | | |
| Benzene | 1.942 | 1.717 | 1.449 | 1.058 |
| $CCl_4$ | 1.094 | 1.001 | 0.952 | 0.823 |
| Toluene | 1.503 | 1.348 | 1.299 | 0.954 |
| Adsorptions from water | | | | |
| Benzene | 1.145 | 1.167 | 0.998 | —[1] |
| $CCl_4$ | 0.892 | 0.858 | 1.004 | 0.757 |
| Toluene | —[1] | 0.536 | 0.374 | 0.556 |
| Styrene | 0.494 | 0.469 | 0.418 | 0.287 |
| Ethylbenzene | —[1] | 0.482 | 0.318 | 0.256 |
| o-xylene | —[1] | —[1] | —[1] | 0.275 |

[1]Non-Langumir in nature.

What is claimed is:

1. A method of adsorbing an organic compound from air or water comprising contacting the organic compound in the air or water with a quaternary phosphonium ion-exchanged colloidal clay including a quaternary phosphonium ion-exchanged cation of the formula:

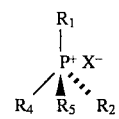

wherein $X^-$ is selected from the group consisting of $Cl^-$, $Br^-$ and $I^-$; wherein $R_1$, $R_2$, $R_3$ and $R_4$ are organic moieties selected from the group consisting of short chain alkyl moieties ($C_1$–$C_4$); long chain alkyl moieties ($C_4$–$C_{20}$); substituted alkyl moieties having 1 to about 20 carbon atoms; substituted or unsubstituted cyclo-alkyl moieties; substituted or unsubstituted aryl moieties; substituted or unsubstituted alkaryl moieties; alkenes; alkynes; aldehydes; ketones; alcohols; carboxylic acids; esters; ethers; cyclic ethers; and combinations thereof.

2. The method of claim 1, wherein the organic compound is selected from the group consisting of a petroleum component, a petroleum derivative, and combinations thereof.

3. The method of claim 1, wherein at least one of $R_1$, $R_2$, $R_3$ and $R_4$ is a substituted or unsubstituted aryl moiety selected from the group consisting of phenyl; napthenyl; trienyl; pyridyl; pyrrolyl; furyl; pyrzaolyl; pyridazinyl; pyrimidyl; quinolyl; isoquinolyl; and acridincyl.

4. The method of claim 1, wherein at least one of $R_1$, $R_2$, $R_3$ and $R_4$ is a substituted alkaryl moiety, wherein the alkaryl moiety is substituted with a functionality selected from the group consisting of a hydroxy; alkoxy (—OR); alkyl (—R);

halo (—X); amino (—NH$_2$, —NHR, —NR$_2$); nitro (—NO$_2$); cyano (—CN); alkyl sulfonyl (—SO$_2$R); mercapto (—SH); alkylthio (—SR); carbonyl (—CO—Y); and mixtures thereof; wherein R is an alkyl group having one to about twenty carbon atoms; X is a halogen atom selected from chloro, bromo and fluoro; and Y is selected from the group consisting of hydrogen, hydroxy, alkoxy, haloamino and alkyl having one to about twenty carbon atoms.

5. The method of claim 1, wherein at least one of R$_1$, R$_2$, R$_3$ and R$_4$ is an aryl moiety having three to seven carbon atoms.

6. The method of claim 5, wherein at least one of R$_1$, R$_2$, R$_3$ and R$_4$ is benzyl or phenyl.

7. The method of claim 1, wherein the organic compound is selected from the group consisting of benzene; toluene; o-xylene; m-xylene; p-xylene; ethylbenzene; butylbenzene; naphthalene; dichloromethane; trichloromethane; tetrachloromethane; monochloroethane; dichloroethane; trichloroethane; monochloroethene; dichloroethene; trichloroethene; tetrachloroethene; polychlorinated biphenyls; dioxin; and mixtures thereof.

8. The method of claim 7, wherein at least one of R$_1$, R$_2$, R$_3$ and R$_4$ is selected from the group consisting of benzyl and phenyl.

9. The method of claim 8, wherein the clay is a smectite clay.

\* \* \* \* \*

UNITED STATES PATENT AND TRADEMARK OFFICE
CERTIFICATE OF CORRECTION

PATENT NO. : 5,587,084

DATED : December 24, 1996

INVENTOR(S) : Stephen A. Boyd and Ravi Kukkadapu

It is certified that error appears in the above-indentified patent and that said Letters Patent is hereby corrected as shown below:

Face page, in the Abstract, line 9, "cycloakyl" should be --cycloalkyl--.

Column 3, line 43, in the structure "$X^+$" should be --$X^-$--.

Column 4, line 3, "2A, 2B, 26, 2D" should read --2A, 2B, 2C, 2D--.

Column 4, lines 47 and 48, the phrase "with this embodiment of the present invention may also" should be deleted.

Column 4, line 48, "$Fe^{2+0}$" should be --$Fe^{2+}$--.

Column 4, lines 49 and 50, the phrase "with this embodiment of the present invention may also" should be deleted.

Column 4, line 51, "$Ca^{2+0}$" should be --$Ca^{2+}$--.

Column 4, lines 51 and 52, the phrase "with this embodiment of the present invention may also" should be deleted.

Column 4, line 52, "$Na^{+0}$" should be --$Na^+$--.

Column 4, line 57, "hectorire" should be --hectorite--.

Column 5, line 17, in the structure "$X^+$" should be --$X^-$--.

UNITED STATES PATENT AND TRADEMARK OFFICE
CERTIFICATE OF CORRECTION

PATENT NO. : 5,587,084
DATED : December 24, 1996
INVENTOR(S) : Stephen A. Boyd and Ravi Kukkadapu It is certified that error appears in the above-indentified patent and that said Letters Patent is hereby corrected as shown below:

Column 5, line 35, in the structure "$X^+$" should be --$X^-$--.

Column 5, line 61, "-$NR_2$);" should be -- -$NR"_2$);--.

Column 7, line 8, "CCl4" should be --$CCl_4$--.

Column 7, line 42, "$CCL_4$" should be --$CCl_4$--.

Column 7, line 64, "generally ≥ 3%" should be --generally ≤ 3%--.

Column 8, line 44, ($R_2 > 0.97$)" should be --($R^2 > 0.97$)--.

Column 9, line 61, "bentonire" should be --bentonite--.

Column 12, line 43 (Claim 1), in the structure "$R_5$" should be --$R_3$--.

UNITED STATES PATENT AND TRADEMARK OFFICE
CERTIFICATE OF CORRECTION

PATENT NO. : 5,587,084
DATED : December 24, 1996
INVENTOR(S) : Stephen A. Boyd and Ravi Kukkadapu It is certified that error appears in the above-indentified patent and that said Letters Patent is hereby corrected as shown below:

Column 12, line 63 (Claim 3), "acridincyl" should be --acridinyl--.

Signed and Sealed this

Twenty-fourth Day of June, 1997

Attest:

BRUCE LEHMAN

Attesting Officer

Commissioner of Patents and Trademarks